United States Patent [19]

Asava et al.

[11] Patent Number: 6,148,277

[45] Date of Patent: Nov. 14, 2000

[54] APPARATUS AND METHOD FOR GENERATING MODEL REFERENCE TESTS

[75] Inventors: Anand Asava, Plano; Chao-Kuang Chen, Dallas; Shao-Min Juan, Plano., all of Tex.

[73] Assignee: Nortel Networks Corporation, Montreal, Canada

[21] Appl. No.: 08/993,532

[22] Filed: Dec. 18, 1997

[51] Int. Cl.[7] .................................................. G06F 9/45
[52] U.S. Cl. ............................ 703/22; 703/7; 703/13; 379/10; 379/15; 702/123
[58] Field of Search .......................... 395/500; 379/10, 379/15; 702/123; 703/7, 13, 2, 22

[56] References Cited

U.S. PATENT DOCUMENTS

| | | | |
|---|---|---|---|
| 5,359,546 | 10/1994 | Hayes et al. | 702/123 |
| 5,633,909 | 5/1997 | Fitch | 379/15 |
| 5,799,266 | 8/1998 | Hayes | 702/123 |
| 5,856,984 | 1/1999 | Rushworth | 371/22.1 |
| 5,987,633 | 11/1999 | Newman et al. | 714/712 |

OTHER PUBLICATIONS

Desia, "Test Case Management System (TCMS)", IEEE Communications: The Global Bridge: GLOBECOM '94 Global Telecommunications Conference, pp. 1581–1585, 1994.

Malaney, "DARTS: An Automated Feature Test Sytstem for a Digital Central Office Switching System", IEEE Proceedings of the Third Symposium on Assessment of Quality Software Development Tools, pp. 112–124, 1994.

*Primary Examiner*—Kevin J. Teska
*Assistant Examiner*—Samuel Broda
*Attorney, Agent, or Firm*—Carr & Storm, L.L.P.

[57] ABSTRACT

A test generation method and apparatus for generating an executable testcase from a high-level functional description that is generated from functional description data relating to a target system. Provided is a computer system with a knowledge base stored on an electronic memory storage device. The knowledge base has a set of functional description data that relates to the target system on which a software function is to be tested. Through a user interface, a high-level testcase request is made for a certain function of the target system. A testcase generation program accepts as an input argument the output file and generates an executable testcase based on the set of functional description data maintained in the knowledge base.

8 Claims, 11 Drawing Sheets

FIG. 1

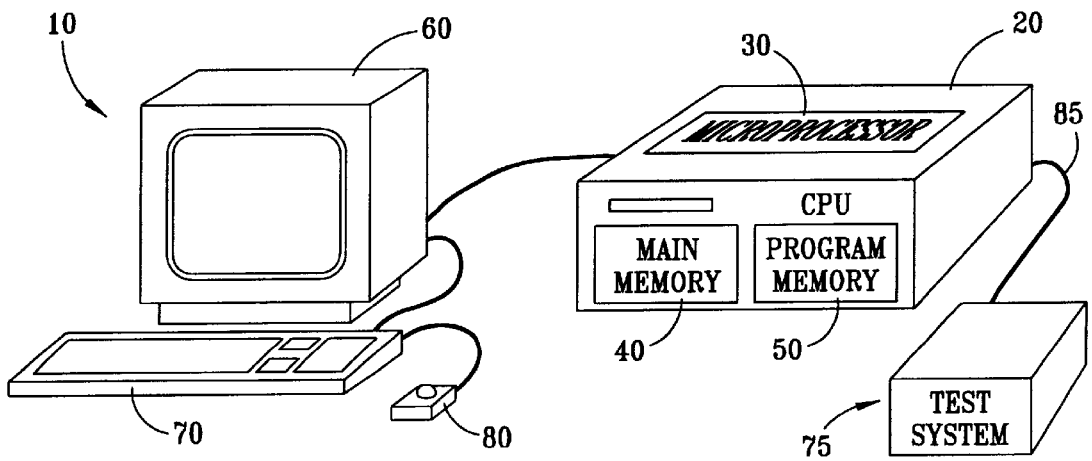

FIG. 9

```
r2_clli (orig, "%ORIG%");
itu_clli (term, "%TERM%", "%TERM_CIC%");
//<LegInfo> R2_CallUp_ITU (leg1, orig, term)
// MR2 Origination
send_seize (orig); // send seize and wait for SZA
send_cld (orig, "%TERM_CDPN%F"); //send CdPN
recv_mfc (orig, 3); //switch requests calling party category
send_mfc (orig, 2); //Send Regular
//!TABLE OFCVAR
//!KEY MARKET
//!FIELD PARMVAL
//!VALUE %ORIG_MARKET% NIL
//!TABLE TRKGRP
//!KEY %ORIG%
//!FIELD CARRID
//!VALUE %TERM_PCARRID%
log_billing ("%ORIG%","%TERM%");
//<LegInfo> ITU_Answer_R2 (leg1, term, orig)
recv_itu_IAM (term);
send_itu_ACM (term);
recv_mfc (orig, 1);
send_itu_ANM (term);
recv_answer (orig); // Receive Answer MR2
// **********TALKING***********
voice_path (orig, term);
//<LegInfo> R2_Forward_ITU (leg1, orig, term)
send_clr_forward (orig); //R2 Tears down the Call
recv_itu_REL (term);
send_itu_RLC (term);
recv_idle_rel (orig);
```

FIG. 5

```
@TPID:    tp1
@USR_ALIAS:
          trk0= orig;
          trk1= term;
@LEG:  leg1
       #OALIAS:    orig
       #TALIAS:    term
       #OTRKCLASS: r2
       #TTRKCLASS: elitu
       #OPROTOCOL: r2
       #TPROTOCOL: ITU
       #CALLTYPE:  ddd
       #OSERVICE:
                ANIDIGS=  N;
                TRKCLASS= SHARED;
                PRTNM=    GPXA;
                MARKET=   GLOBAL;
                DATA=     N;
                EOD=      N;
                ANISCRN=  N;
       #TMESSAGE:
                $PRM7: T1acm acm.Access_delivery_information.Access_delivery_indicator
@CALLFLOW:
R2_CallUp_ITU (leg1, orig, term)
ITU_Answer_R2 (leg1, term, orig)
R2_Forward_ITU (leg1, orig, term)
@ENDTP:
```

```
@TPID:  tp1                                              } 520
@USR_ALIAS:
        trk0= orig;                                      } 522
        trk1= term;
@LEG:  leg1
   #OALIAS:     orig
   #TALIAS:     term
   #OTRKCLASS:  r2
   #TTRKCLASS:  elitu
   #OPROTOCOL:  R2
   #TPROTOCOL:  ITU
   #CALLTYPE:   ddd
   #OSERVICE:
        ANIDIGS=   N;
        TRKCLASS=  SHARED;
        PRTNM=     GPXA;
        MARKET=    GLOBAL;                               } 524
        DATA=   N;
        EOD=    N;
        ANISCRN=   N;
   #TSERVICE:
        SUPERGD=   N;
        INTERFACE=  PSTN;
        SCC=    N;
   #TMESSAGE:
        $PRM7: T1acm acm.Access_delivery_information.Access_delivery_
                indicator <No set-up message generated>
@DMSDMO
   #CLLI: orig
        MMR22SHDNN01= ./dmo_AAAa02356
   #CLLI: term
        MITURIE1A01A= <NIL>                              } 326
        MITURIE1A01B= <NIL>
        MITURIE1A01C= <NIL>
        MITURIE1A01D= <NIL>
@CALLFLOW:
R2_CallUp_ITU (leg1, orig, term)
ITU_Answer_R2 (leg1, term, orig)                         } 526
R2_Forward_ITU (leg1, orig, term)
@ENDTP:
```

FIG. 8

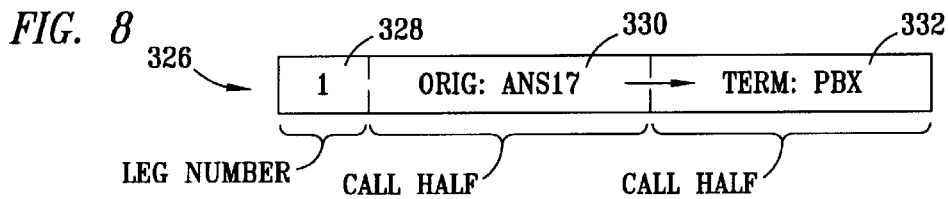

FIG. 11A  340

```
@TPID:  tp1                                                     } 520
* * *
─────────────────────────────────────────────
@USR_ALIAS:                                                     } 522
* * *
─────────────────────────────────────────────
@LEG:  leg1                                                     } 524
* * *
─────────────────────────────────────────────
@DMSDMO:
    #CLLI: orig
        MMR22SHDNN01=  ./dmo_AAAa02356
    #CLLI: term
        MITURIE1A01A=  <NIL>                                    } 326
        MITURIE1A01B=  <NIL>
        MITURIE1A01C=  <NIL>
        MITURIE1A01D=  <NIL>
─────────────────────────────────────────────
@CALLFLOW:
        R2_CallUp_ITU (leg1, orig, term)
        ITU_Answer_R2 (leg1, term, orig)                        } 526
        R2_Forward_ITU (leg1, orig, term)
─────────────────────────────────────────────
@TEMPLATE:
//<*********************************************************
//<**        Beginning of Template Section              **
//<*********************************************************
r2_clli (orig, "%ORIG%");
itu_clli (term, "%TERM%", "%TERM_CIC%");
//<LegInfo> R2_CallUp_ITU (leg1, orig, term)
//MR2 Origination
send_seize (orig); // send seize and wait for SZA
send_cld (orig, "%TERM_CDPN%F"); //send CdPN
recv_mfc (orig, 3); //switch requests calling party category
send_mfc (orig, 2); //Send Regular
//!TABLE OFCVAR
//!KEY MARKET
//!FIELD PARMVAL                                                } 336
//!VALUE %ORIG_MARKET% NIL
//!TABLE TRKGRP
//!KEY %ORIG%
//!FIELD CARRID
//!VALUE %TERM_PCARRID%
log_billing ("%ORIG%","%TERM%");
//<LegInfo> ITU_Answer_R2 (leg1, term, orig)
recv_itu_IAM (term);
set_val (term,
    itu.acm.Access_delivery_information.Access_delivery_indicator,
    "No_set-up_message_generated");
```

```
@TCID: TC000001
@TITLE: R2 (DDD) -> E1ITU
@AUTHOR: srobin
@KEYWORDS: OR2, TE1ITU, DDD
@PLATFORM: STEP
@DESCRIPTION:
R2 (DDD) -> E1ITU
@BILLING: FOR FUTURE EVOLUTION
@BITE_SECTION: TBD
@BITE_MODULE: TBD
@BITE_SUBSYSTEM: IBASESUB
@DATAFILL:
DMOPRO:
TABLE OFCVAR
KEY MARKET
FIELD PARMVAL
VALUE GLOBAL NIL
TABLE TRKGRP
KEY MMR22SHDNN01
FIELD CARRID
VALUE 0000
table trkgrp
key MMR22SHDNN01
field prtnm
value GPXA
@CODE:
```

602:
```
r2_clli (orig, "MMR22SHDNN01");
itu_clli (term, "MITURIE1A01B", "14");
```

604:
```
// MR2 Origination
send_seize (orig); // send seize and wait for SZA
send_cld (orig, "5019711234F"); //send CdPN
recv_mfc (orig, 3); //switch requests calling party category
send_mfc (orig, 2); //Send Regular
```

606:
```
log_billing ("MMR22SHDNN01","MITURIE1A01B");
recv_itu_IAM (term);
send_itu_ACM (term);
recv_mfc (orig, 1);
send_itu_ANM (term);
recv_answer (orig); // Receive Answer MR2
// **********TALKING***********
voice_path (orig, term);
```

```
send_clr_forward (orig); //R2 Tears down the Call
recv_itu_REL (term);
send_itu_RLC (term);
recv_idle_rel (orig);
```

APPARATUS AND METHOD FOR GENERATING MODEL REFERENCE TESTS

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyrights whatsoever.

TECHNICAL FIELD

The present invention relates to an apparatus and method for generating model reference tests for software programs, and more particularly, to generating model reference tests for telecommunications systems software programs.

BACKGROUND

Testing and verification of modern software-based systems require automating both the test generation and the test execution. Nevertheless, present test development techniques and tests systems still rely on the expertise of a single engineer to efficiently and thoroughly prepare these tests.

Testing Applications-Under-Test ("AUTs") has been systematically and manually approached to counter three major challenges in validation and verification of AUTs for target systems.

First, high quality must be maintained even though software complexity increases. For example, telecommunication systems must have a downtime of less than minutes per year. This performance standard requires test coverage to be correspondingly high in order to ensure that latent software defects do not cause system failures after the product is deployed in the field.

Second, competitive pressures require manufacturers to have a quick turn-around time without compromising product reliability. Therefore, while testing must be expanded to improve coverage and to guarantee reliability, the present time requirements to conduct testing must be reduced.

Third, testing costs need to be minimized without sacrificing product quality. Thus, hiring additional personnel will not achieve this goal because of the additional costs.

Accordingly, software testing and verification for software-based systems has become a major hurdle to the delivery of new telecommunication products. Most of the verification time is spent in test generation, not testing.

Manual test generation, or script writing, is time consuming because it requires a laborious, brute-force approach. Working from the target system specifications, an engineer must try to conceive of every possible function and condition to which the AUT can be subjected, and then write a testcase to replicate the conditions. There is no way to ensure that all the functions and conditions are covered. Furthermore, if any changes are made later in the target system specifications, portions of the testcase may become obsolete due to its static nature. That is, testcases are unable to dynamically conform to changes in the system specifications, requiring an entire re-write of the testcase.

Clearly, the adequacy of the generated testcase relies on the expertise and experience of the engineer. Modeling tools that implement visual programming have become available to test engineers.

But such tools remain merely as aids to the test engineer. Consistent, thorough tests are not available because the engineer must still define the functions and conditions for the product model. The more experienced and weathered the engineer, the greater the depth of completeness and functionality of the resulting generated testcase. These qualities still remain with the engineer. If an experienced engineer leaves, then testcase generation again becomes a major hurdle to the delivery of new telecommunication products while a junior engineer becomes sufficiently trained to generate thorough and complete tests.

Also, such tools have embedded boundary conditions in the system model that are not readily redefined. The ability to selectively manipulate boundary conditions provides the engineer with insights to modify an AUT to overcome problematic software code portions.

Accordingly, a need exists for testcase generation of software-based computer systems that can provide thorough and consistent quality test scripts independent of the experience and knowledge of the test engineer. The testcase generation system is needed to allow a user to operate on a cross-section of an entire system model of a product to provide testcases. Also, a need exists for testcase script generation based on the accumulated knowledge of numerous test engineers such that the knowledge and experience remains, even after the departure of personnel.

SUMMARY OF INVENTION

Thus provided herein is a test generation method and apparatus for generating an executable testcase from a high-level functional description that is generated from functional description data relating to a target system.

A computer system has an electronic memory storage device storing a knowledge base. The knowledge base has a set of functional description data that relates to the target system on which a software function is to be tested. Through a user interface, a high-level testcase request is made for a certain function of the target system. A testcase generation program accepts as an input argument the testcase request and generates an executable testcase based on the set of functional description data maintained in the knowledge base.

In another aspect of the invention, provided is a computer executable method for generating a model reference testcase for a target system. A testcase request file is generated based on a high-level target system function. The testcase request file is datafilled, and a template is generated in the testcase request file for a call flow. At least one alphanumeric variable representation is translated to a corresponding numeric value in the testcase request file from a rules module. At least one telephony message protocol is inserted in the testcase request file.

BRIEF DESCRIPTION OF DRAWINGS

For a more complete understanding of the present invention, and the advantages thereof, reference is made to the following description taken in conjunction with the accompanying drawings, wherein:

FIG. 1 is an illustration of a computer system providing a platform for the invention;

FIG. 5 is an illustration of an output file from the user interface;

FIG. 7 is an illustration of an output file from the testcase datafill generator module through a runtime process;

FIG. 8 is an illustration of a call leg;

FIG. 9 is an illustration of the testcase template generated by a testcase template generator of the invention;

FIG. 12 is an illustration of a resulting executable testcase file generated by the invention.

DETAILED DESCRIPTION

Figure 2:
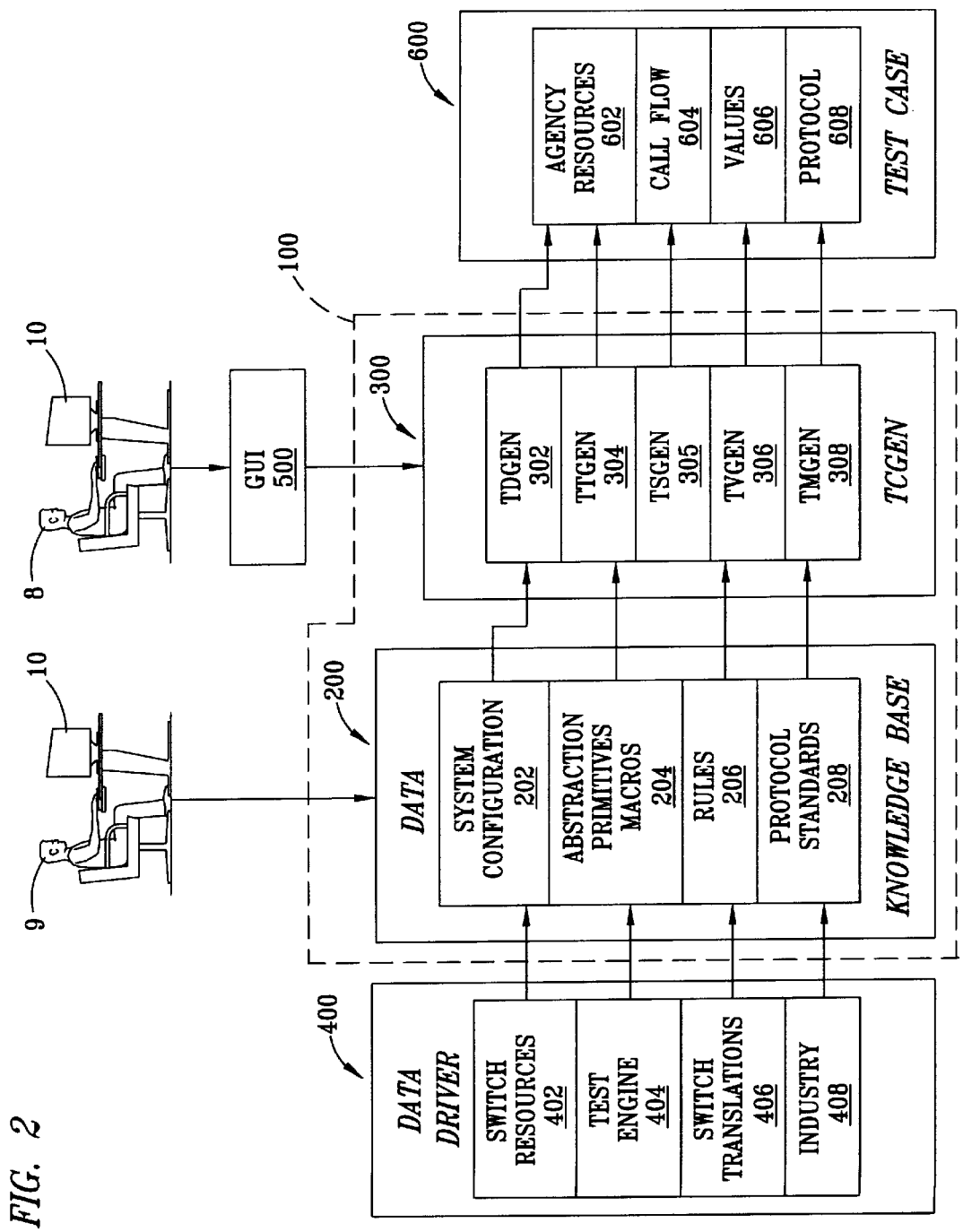
FIG. 2 is a diagram of the Computer-Aided System Development Environment of the invention.

The principles of the present invention and their advantages are best understood by referring to the illustrated embodiment depicted in the FIGURES, in which like reference numbers describe like parts.

Referring to FIG. 1, the invention is preferably implemented in a computer system such as system 10. The system 10 includes a central processing unit ("CPU") 20 including a microprocessor 30 coupled to a main memory 40, and a program memory (such as Read Only Memory or Random Access Memory) 50. Computer input and output is displayed on a computer monitor 60 or other output device, such as a printer. User input is provided through keyboard 70, a mouse or track ball 80, or other standard input devices.

The system 10 is conventional, and may be a workstation or networked terminal system, or any of a variety of other apparatus providing computing and input/output capabilities. Preferably, system 10 is an HP-UX workstation available from Hewlett-Packard of Palo Alto, Calif., that is in a networked-workstation environment having a UNIX-based operating system.

The test execution tool 75 is an implementation of a target system specification. The implementation may be a software implementation of a software specification, a hardware implementation of a design specification for a hardware-implemented system, or a combination of hardware and software implementations.

Connection 85 represents an interface between the computer system 10 and the test execution tool 75. The connector 85 can constitute software modules, firmware drivers implemented in software, or any apparatus and associated software needed to cause the test execution tool 75 to perform the functions set forth in its specification, so that the system of the present invention can determine whether those functions have been executed as prescribed.

It should be noted that although the description below concentrates on application of the invention to telephony technologies, the invention disclosed herein is a general-purpose approach used in conjunction with a test execution tool 75 to test specific software applications or AUTs. For example, combined with an appropriate test execution tool, the invention disclosed herein can be used to test software for target products such as network administration systems, computer-aided design tools, avionic systems, and automotive controllers. For telephony call processing applications, a suitable execution tool 75 is a STEP, developed by Northern Telecom Limited of Canada. An Integrated Telecommunications tester is also available from Teradyne Inc. of Boston, Mass., or the Crescendo call generator available from Ameritec of Covina, Calif. Preferably, for call generation, the execution tool used is a STEP.

FIG. 2 shows, in phantom lines, a Computer-Aided System Development Environment ("CASDE") 100. The CASDE is executable on the system 10. The CASDE 100 includes a system knowledge base 200 and a testcase generator ("TCGEN") 300. The CASDE 100 is capable of generating testcases based on functional requirement specifications that are stored in the knowledge base 200.

In FIG. 2, the system knowledge base 200 is a product functionality inventory. In essence, the system knowledge base provides an inventory of black-box cause-and-effect characteristics of the target product. The focus of the functionality inventory is not on the structural or manufacturing details, but the behavior characteristics of the target product.

The knowledge base 200 has a system configuration module 202, a functional module 204, a rules module 206, and a protocol standards module 208. These modules are globally-accessed by the TCGEN 300 as configuration files, rules tables, and relational database tables generated from external data provided by data sources or data drivers 400. A relational database is used to model a telecommunications switch system, such as the Digital Multiplexed System ("DMS") available from Northern Telecom Limited, through switch tables, and agency interworking. The relational database also contains macro abstractions that are referenced by the script language of execution tool 75. The relational database implemented preferably as Standard Query Language ("SQL") capability. Other relational databases with this capability are available such as that from Oracle of Redwood City, Calif. It is preferable to use a commercially available relational database such as Ingres from Computer Associates, Inc. of Richardson, Tex. The data drivers 400 include a switch resources module 402, a test engine module 404, a switch translations module 406, and an industry standards module 408.

The switch resources module 402 provides system specification information regarding telecommunications switches services. Specification information is available from switch manufacturers such as Northern Telecom Limited, Lucent Technologies, Alcatel, and the like.

The test engine module 404 provides specification information for the test execution tool 75 necessary to execute a testcase. For example, the test engine module 404 pertains to the test execution tool 75 and to switch manufacturer Dialing Plans ("DP"), call states, call flow.

The switch translations module 406 provides specification information regarding the type of telecommunications switch. For example, the specification information refers to the switch manufacturer configuration parameters for their switches, state diagrams of the switch behavior, and call-processing behavior of the switch.

The industry standards module 408 provides information relating to messaging and protocol states as dictated by industry standards (or customer standards that are based on the industry standards). An example of an industry standard is "Signalling System No. 7—Signalling Performance in the Telephone Application." Also known as SS7, this standard was promulgated by the Telecommunication Standardization Sector of the International Telecommunication Union ("ITU").

Still referring to FIG. 2, access to the knowledge base 200 for specification and requirements updates or initial knowledge base data configuration is limited to the system administrator level. The system administrator level is a highly restricted access level to maintain the veracity of the database. With an administrator 9, update requests are processed, changes and additions are tracked, and processed through a revision control system that establishes a record on the knowledge base 200.

As a further engineering feature, flexibility is provided to design and test engineers to generate a local knowledge base (stored on system 10 accessed by the user 8) that is a derivative of the global knowledge base 200. This flexibility allows a temporary circumvention of the administrative procedures to request a knowledge base update when time is of the essence. The contributions of the design and/or test engineer can then be added by the administrator 9 to the knowledge base through update request procedures.

Figure 3:
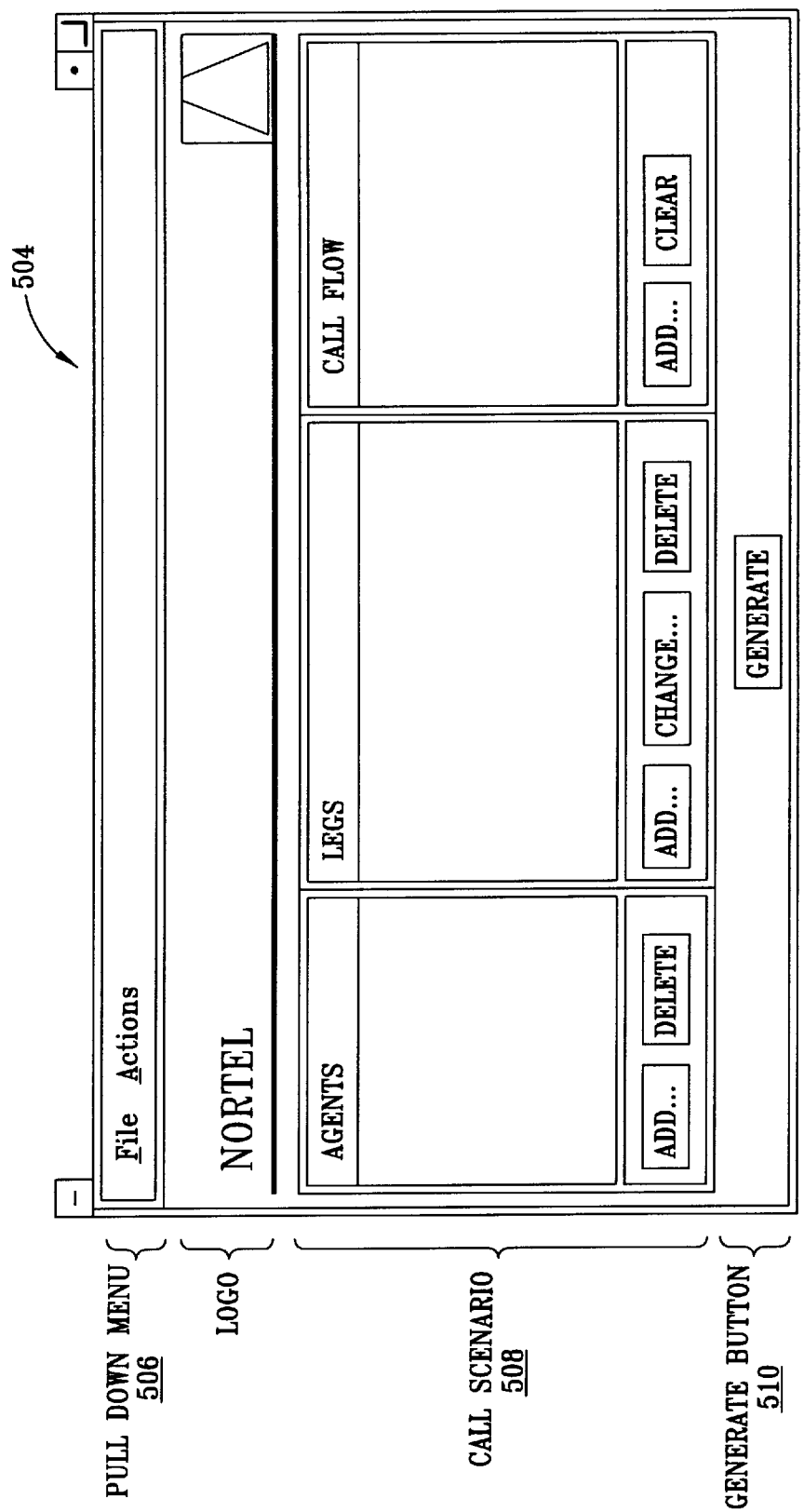
FIG. 3 is an illustration of the top-level window of the user interface of the invention.
Figure 4:
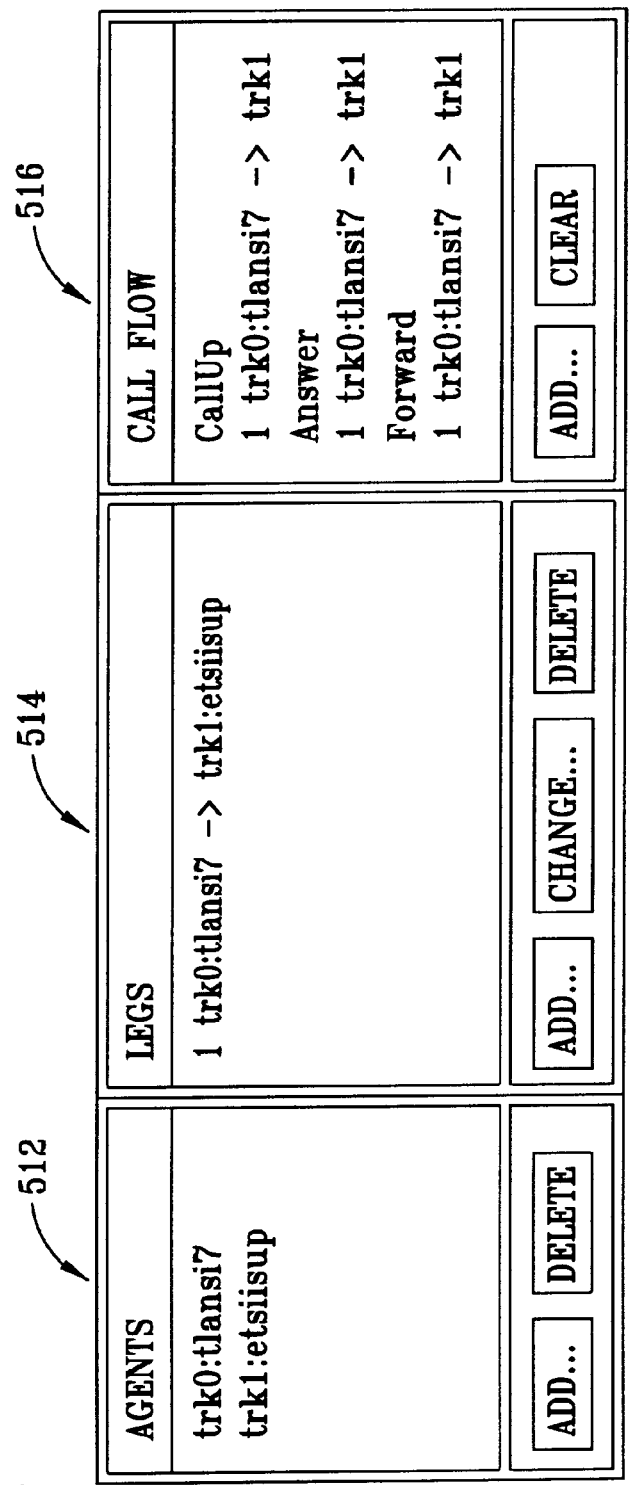
FIG. 4 is an illustration of the call scenario area of the user interface.

FIGS. 3 and 4 show the main windows of a Graphic User Interface ("GUI") 500. The GUI 500 is a display format generated on system 10 that allows a user 8 (see FIG. 2) to choose commands, start programs, and other options by pointing to pictorial representations and lists of menu items on the screen. The GUI 500 provides an environment for direct interaction with the system 10, freeing the user 8 to concentrate on the application without needing to provide detailed keyboard input. The GUI 500 provides a consistent, standard output file 502 that can be processed by the TCGEN 300.

Before invoking the GUI 500 on the system 10, the CASDE_ROOT environment variable allows the TCGEN 300 to access the knowledge base 200. For example, in a UNIX-based system, the environmental variable is set through the commands:

ksh prompt> export CASDE_ROOT="<customer knowledge base path>"

Then the $CASDE_ROOT/bin is prepended to the PATH environmental variable:

ksh prompt> export PATH=$CASDE_ROOT/bin:$PATH

The CASDE GUI 500 is then invoked by issuing the following command:

ksh prompt> tcgen

Referring to FIG. 3, the top-level window 504 is displayed on the monitor 60 (see FIG. 1) after the GUI 500 is involved. The top-level window 504 has three principal areas: a pull-down menu 506, the call scenario area 508, and the GENERATE button 510.

Referring to FIG. 4, the call scenario area 508 is further divided into three subwindows: a Call Agent subwindow 512, a Call Leg subwindow 514, and a Call Flow subwindow 516.

A call leg is defined in the Call Leg subwindow 514 with two call agents. The term "call flow" as used herein means a sequence of call actions and call legs. The term "agent" as used herein means a physical medium with some basic signalling characteristics that are used to make telephony calls.

The layout of the GUI 500 as shown in FIG. 4 is fixed, but the contents or substance of the GUI is configurable through a tcgen.cfg file. The tcgen.cfg file provides information to be presented in the subwindows 512, 514, and 516, and any further subset window of the subwindows, as well as establishing the sequence of the open-chain program structure, discussed later.

The CASDE GUI 500 creates a metalanguage based on a metalanguage set. A metalanguage is also called an application description language. Referring to TABLE 1, the metalanguage set for TCGEN 300 is:

TABLE 1

| Metalanguage Keyword | Mandatory/ Optional | Description |
| --- | --- | --- |
| @TPID: | Mandatory | This is the template identification |
| @USR_ALIAS: | Optional | User defined aliases |
| @USR_CCLI: | Optional | User defined CLLIs ("Common-Language Location Identification") |
| @LEG | Mandatory | Since a call may have several legs, this field states which leg is being described as selected by the user in the Call Leg subwindow 514 (see FIG. 4) |
| #OALIAS: | Mandatory | Alias value of the originating trunk |
| #TALIAS: | Mandatory | Alias value of the terminating trunk |
| #OTRKCLASS: | Mandatory | Originating trunk type value (e.g., fgd, dal, tlisup) |
| #TTRKCLASS: | Mandatory | Terminating trunk type value |
| #OPROTOCOL: | Mandatory | Originating trunk protocol value, for example, PTS, ANS17, or Private Business Exchange ("PBX"). |
| #TPROTOCOL | Mandatory | Terminating trunk protocol value |
| #OSERVICE: | Optional | List of services associated with the originator |
| #TSERVICE | Optional | List of services associated with the terminator |
| #CALLTYPE: | Mandatory | The calltype for the given leg, for example, Direct Distance Dialing ("DDD"), International Direct Distance Dialing ("IDDD"). |
| #USERIN: | Optional | List of additional parameters entered by the user based on the CALLTYPE and OTRKCLASS |
| #ISUPLOOP: | Optional | Number or type of ISDN Service User Part ("ISUP") loops |
| #OMESSAGE: | Optional | List of parameters/fields set by the user in the originators <msg_type>. |
| #TMESSAGE: | Optional | List of parameters/fields set by the user in the terminators <msg_type>. |
| #SCP: | Optional | Details the flow of any Signal Control Point ("SCP") of the call leg. |
| #CHKVAL: | Optional | Which parameters to perform a check_val and what are the values |
| @CALLFLOW: | Mandatory | This is the callflow as selected by the user in Call Flow subwindow 616 |

© 1997 Northern Telecom Limited

The metalanguage set of TABLE 1 can be expanded to include other keywords to accommodate different test execution tools 75. The metalanguage describes the testcase parameters selected by a user 8. The selected parameters are then loaded into a GUI metalanguage output file such as "gui_meta_language." This output file is a GUI session that can be stored and later reloaded into the GUI 500 for recreating testcases or for updating the testcases in the event the knowledge base 200 has been modified.

In FIG. 5, shown is an example of a GUI metalanguage output file 502. Referring to FIGS. 4 and 5, the metalanguage output file 502 has a template identification field 520 for identifying the file 502, a user-defined alias field 522 for the origination and termination agents chosen in the Call Agent subwindow 512, a Call Leg field 524 that corresponds to the user data entered in the Call Leg subwindow 514, and a Call Flow field 526 that corresponds to the user data entered in the Call Flow subwindow 516. These fields are acted on by the TCGEN 300 when the generate button 510 (see FIG. 3) is pressed.

The Call Flow field 526 of the GUI output file 502 is set out by a TCGEN configuration file. The tcgen configuration file has the following structure:

```
* * *
@ACTION:1          := Keyword that gives the number of legs for a
                      call action;
#TITLE:CallUp      := the category title displayed by the GUI 600;
#SUBTITLE:CallUp   := the action chosen by a user from the GUI 600;
$SEND:             :=sending protocol
$ACTION:           := action within the call flow string
$RECV:             := receiving protocol
$ARG:              := represents an argument passed to the action.
$ARG:              := represents an argument passed to the action.
$ARG:              := represents an argument passed to the action.
$ARG:END           := designates end of the arguments
* * *
``` where the arguments can be:

$ARG:LEG =the leg number involved in the action;

$ARG:ORIGx and $ARG:TERMx=the originator and terminator of the "xth" leg involved in the action;

$ARG:END=the keyword at the end of the argument list. This descriptor must appear at the end of the argument list.

The term "argument" as used herein means a value or an expression used with an operator or passed to a subprogram (subroutine, procedure, or function). The program then carries out operations using the argument or arguments.

Referring back to FIG. 2, the Testcase Generator ("TCGEN") 300 acts on the GUI output file 502. The TCGEN has a layered software architecture that includes the following modules: a Testcase Datafill Generator ("TDGEN") module 302, a Testcase Template Generator ("TTGEN") 304, a Testcase Value Generator ("TVGEN") 306, and a Testcase Messaging Generator ("TMGEN") 308. Another module is a Testcase Substitution Generator ("TSGEN") 310, which substitutes values in the testcase template generated by the TTGEN 304.

The modules of the TCGEN 300 are in an open chain structure (or layered architecture) that is configurable through the tcgen.cfg configuration file. That is, the output of one module provides the input for another module. The format is:

function (input, output)

wherein the modules can be sequenced as follows:

| | |
|---|---|
| tdgen (gui_meta_lang, tdgen.out) | // datafills fields in the GUI output file 502 with values from the system configuration module 202 resources. |
| ttgen (tdgen.out, ttgen.out) | // provides a template for the call flow. |
| tvgen (ttgen.out, tvgen.out) | // translates alphanumeric representations to numeric values. |
| tsgen (tsgen.out, tsgen, out) | //substitutes values in the testcase template to target the template for a particular execution environment or platform. |
| tmgen (tsgen.out, testcase) | // message protocols inserted in GUI output file 502 protocol. |

The structure is an "open" chain structure in that further functional modules can be inserted in the chain as needed by the test developer or engineer. An open program structure, as opposed to an embedded program structure, allows test design flexibility in that test designers can refine a model to accommodate uncommon test scenarios.

Figure 6:
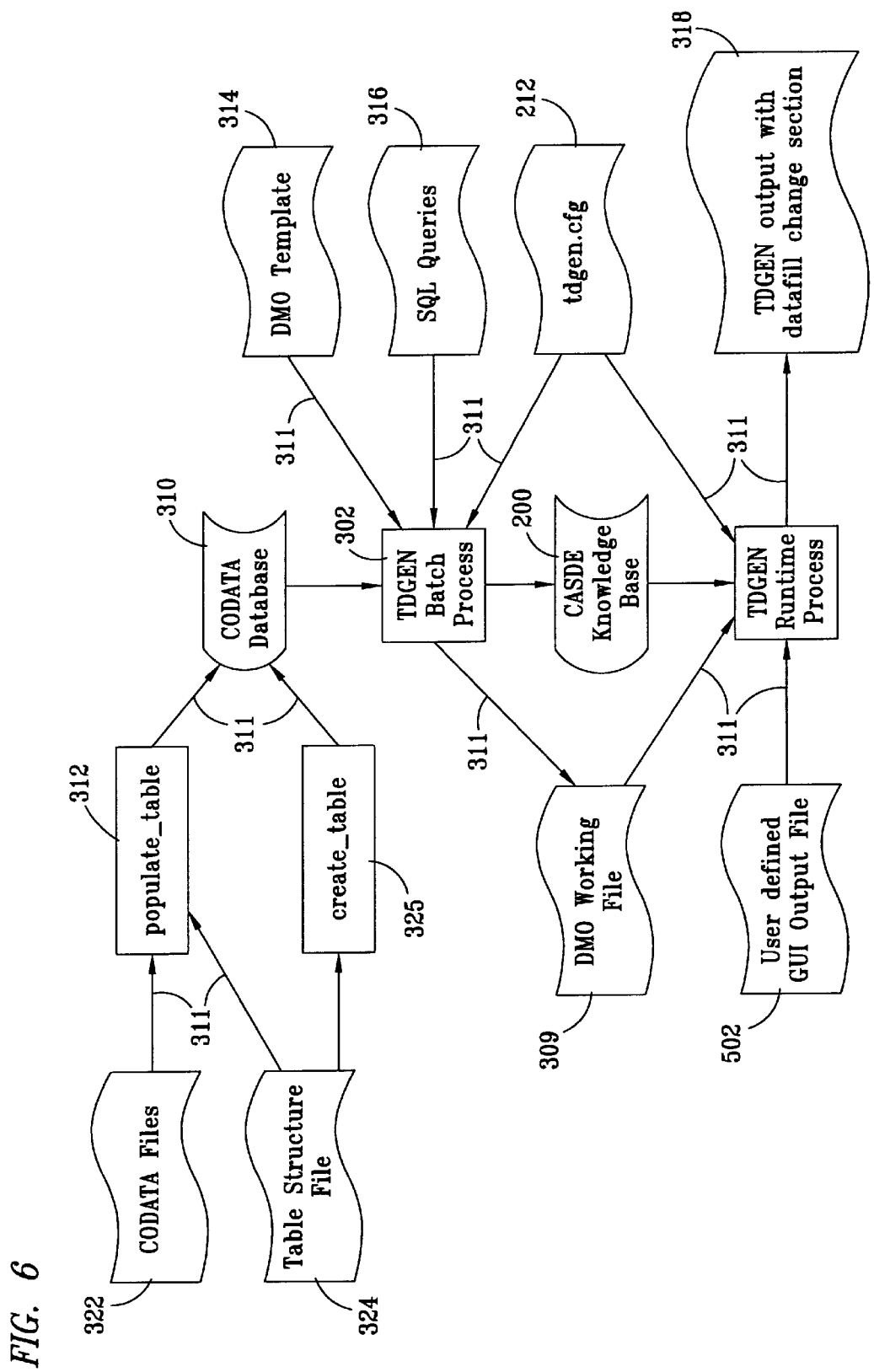
FIG. 6 illustrates the testcase datafill generator software architecture of the invention.

FIG. 6 illustrates the TDGEN 302 software architecture. The TDGEN 302 accesses a captive-office datafill ("codata") relational database 310 having telecommunication switch configuration information, and the knowledge base 200. The codata relational database can be provided by a relational database program.

The communications pathways 311 designate data flow throughout the architecture. The TDGEN 302 pre-processes tasks between the codata relational database 310 and the knowledge base 200. A TDGEN configuration file 212, contains information relating to the system configuration module 202 of the knowledge base 200.

A Datafill Modification Order ("DMO") template file 312 with the configuration file 212 facilitates an SQL query 316 to datafill the GUI output file 502 (see FIG. 5). From the configuration file 212, the TDGEN 302 has the following service information sections with respect to use in telecommunications switch testing:

| | | |
|---|---|---|
| [agent_type] | ::= | indicate the valid agent types for the originator and the terminator; |
| [services] | ::= | service information concerning TDGEN 302; |
| [codata] | ::= | indicates the location of the codata database; |
| [query directory] | ::= | indicates the location of the query and the DMO templates; and |
| [valid trunk table] | ::= | identifies the tables with valid trunk information. |

The TDGEN 302 also conducts SQL queries 316 into the knowledge base 200 to generate telecommunication switch trunk connections to datafill any required information. The codata database 310 uses a relational data model to model telecommunication switches with information in the knowledge base 200.

The codata database 310 requires a populate_table 312 structure to create and populate the codata database 310. The following is the preferred table structure format, designated in the table structure file 324 and the codata files 322, of the populate_table 312:

```
TABLE <table name>
    {
    key_field*
    field*
    }
    key_field=<field name> KEY SIZE <size>
    field=[@|$]<field name> SIZE <size>
``` where key_field is the primary key to uniquely identify the table, and field is the fields of the table. An example of the codata table structure 310 is:

```
TABLE TRKGRP
{
GRPKEY KEY SIZE 20
@GRPTYP SIZE 10
    {
    <DAL>
        {
        TRAFSNO  SIZE 10
             * * *
        }
    }
* * *
```

```
            }
              * * *
        }
```

The codata database 310 contains the service related Digital Multiplex System ("DMS") tables in a relational database format. Examples of DMS systems are digital central office telecommunications switches such as the DMS-10, DMS-100/200, DMS-250, DMS-300, and the DMS-500, which are commercially available from Northern Telecom Ltd.

The TDGEN 302 selects agency resources based on the requested user service request. If the TDGEN 302 cannot find a service set match on a physical telecommunications switch, as presented in the codata relational database 310, then no agency supports the service called "data." To provide the desired service on the target product, the TDGEN 302 will create a Datafill Modification Order Profile ("DMOPROs") command to configure the a physical telecommunications switch to support this service, and unDMOPRO to return the physical telecommunications switch features to the initial configuration state upon completion of the testcase execution.

An example of an output file 318 from the TDGEN 302 runtime process 320 is shown in FIG. 7. The output file 318 resembles the output file 502 passed from the GUI 500. The TDGEN 302 appends a datafill portion 326. In the example of FIG. 7, the datafill portion 326 is the @DMSDMO which is a metalanguage key word (see TABLE 1).

Referring to FIG. 2 again, the TTGEN 304 creates a testcase template based on the call flow information specified in the Call Flow field 526 of the GUI output file 502 (see FIG. 5). That is, the TTGEN 304 (1) interfaces with macros for the test execution tool 75 macros, (2) facilitates creation of abstractions by making queries into the knowledge base 200 based on the call flow information, and (3) creates a testcase template based on the gathered information. The term "abstraction" as used herein means a hierarchical data structure ("em dash") that is, an abstraction including one or more primitive layers. A "primitive" includes one or more macro layers.

The TTGEN 304 references a TTGEN configuration file with a CALLFLOW portion, a SETVAL portion, a CHECKVAL portion, and a SERVICE portion 326. An example of the ttgen.cfg file structure is:

```
        [CALLFLOW]
        *               <trkclass> = _
        *               <calltype> = #CALLTYPE:
        *               <oservice> = default
        *               <tservice> = default
```

The symbols are defined as:

| ttgen.cfg | Description |
| --- | --- |
| * | use default values; |
| <trkclass> | Trunk class is replaced with a "-" (dash); |
| <calltype> | The call type is replaced by the call type of #CALLTYPE: in the GUI output file 602; |
| <oservice> | "originating service," replaced by default; and |
| <tservice> | "terminating service," replaced by default |

An example of testcase template generation is provided with respect to call testing. In test call generation, the objective is to generate the parameters for call legs. A "leg" is a connection between two agencies. An agency is a physical medium with some basic signaling characteristics that are used to originate and terminate a call.

Referring to FIG. 8, illustrated is a call leg 326. The call leg 326 has a leg number 328, an originating call half 330, and a termination call half 332. Each of the call halves 330 and 332 have aliases 333 and 334 that are "org" and "term." Each call leg 326 can have one call type and two sides of services. The term "call type" as used herein means an abstraction for a set of specific call scenarios, each abstraction representing a unique translation method that determines the termination based on the origination and services. For example, a call leg 326 can have:

| Leg Item | Description |
| --- | --- |
| 1 | leg number |
| orig | alias of the originating agent |
| ANSI7 | protocol of the originating agent |
| term | alias of the terminating agent |
| PBX | protocol of the terminating agent |

The leg has call flow items associated with it. Using the example shown in FIG. 8, the associated call flow is:

Item 1—An ANSI7 trunk calls a PBX trunk,

Item 2—The PBX trunk answers, and

Item 3—The originator or terminator call half 330 or 332 disconnects the call.

A general call flow as shown in the Call Flow subwindow 516 (FIG. 4) is composed of several call flow strings. A call flow string is a concatenation of call states/actions (known as primitives) and legs. Referring briefly to FIG. 2, an administrator 9 defines all available call flow strings. A user 8, through the Call Flow subwindow 516 selects call flow order generated from the GUI 500.

Referring back to FIG. 7, the call flow string example, CF_STRING includes two agents and an action (such as "answer," "forward," "callup," and the like). The CF_STRING is ITU_Answer_R2. An argument portion of the CF_STRING function has up to four parameters or arguments. In the example above, three arguments are passed through ITU_Answer_R2: leg1, trk1, trk0. The symbology in the @CALLFLOW metalanguage from the example of the TTGEN input file (which is the TDGEN output file 315) is:

| @CALLFLOW | Description |
| --- | --- |
| R2 and ITU | protocols in the CF_STRING |
| CallUp | call state/action in the CF_STRING |
| Answer | call state/action in the CF_STRING |
| (leg 1, trk0, trk1) | leg and trunk aliases associated with the given call flow statement in the argument |
| @ENDTP | end of testcase scenario |

Note in FIG. 7 that the alias name of R2 is trk0, and the alias name of ITU is trk1.

The qrytt.req file is a dynamic SQL builder created by TTGEN 304 to extract the necessary templates from the knowledge database 200. An example of the SQL abstraction used in the qrytt.req file is as follows:

// - ddd default default

R2_CallUp_ITU(leg1, orig, term)

// - \_\_any\_\_ \_\_any\_\_ \_\_any\_\_

ITU\_Answer\_R2(leg1, term, orig)

// - \_\_any\_\_ \_\_any\_\_ \_\_any\_\_

R2\_Forward\_ITU(leg1, orig, term)

where the designations for the qrytt.req file are:

| qrytt.req | Description |
|---|---|
| // | keyword delimiter |
| — | trunk class |
| ddd | calltype ("Direct Distance Dialing") |
| default | first default is the sending service |
| default | second default is the receiving service |

To extract macros from the relational knowledge base 200, the call flow string, trkclass, calltype, Send\_Service, and Recv\_Service are used as database query keys. The qrytt.req file correlates the call service with the agent without regard to the originator agent or the terminator agent designated in the Call Flow field 526.

After the query file qrytt.req is processed, FIG. 9 shows an example of the resulting qrytt.out file 336, which is the testcase template. The qrytt.out file 328 is generated by the TTGEN 304 routine "qrytt".

Figure 10:
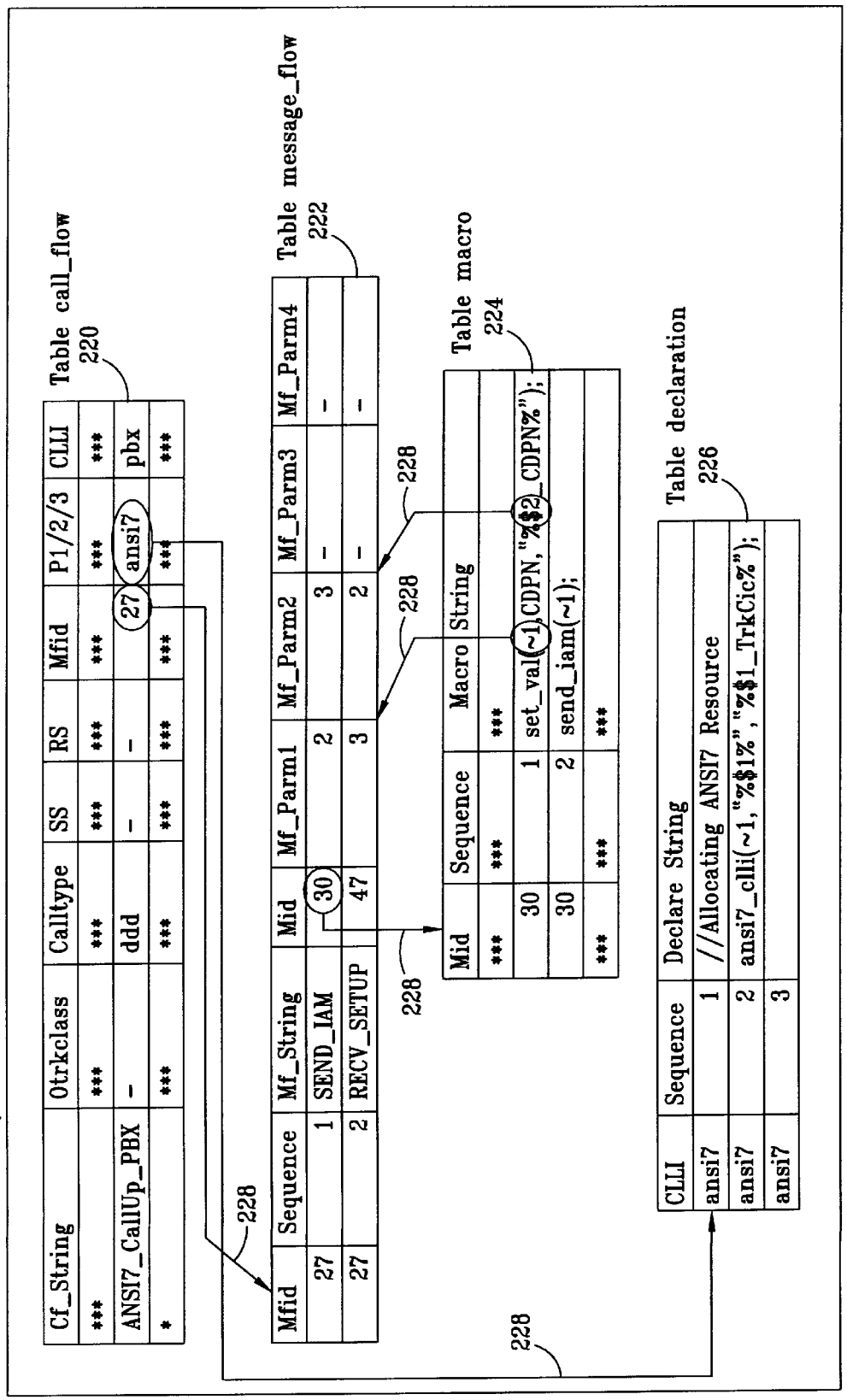
FIG. 10 is an illustration of the tables of the functional module accessed by the invention.

The "qrytt" routine accesses tables in the functional module 204 of the knowledge base 200 (see FIG. 2). In FIG. 10, the functional module 204 includes a call\_flow table 220, a message\_flow table 222, a macro table 224, and a declaration table 226. Relational links 228 illustrate the relational correlations throughout the databases used in the functional module 204.

An "abstraction" is a call flow that corresponds to the call\_flow table 220. A "primitive" is a message flow that corresponds to the message\_flow table 222. A "macro" corresponds to the macro table 224. The call\_flow table 220 is a relational database table including at least the following fields:

| call\_flow fields | Description |
|---|---|
| Cf\_String | primary key; generated from tcgen\_gui.out file |
| Otrkclass | 1st secondary key; output from qrytt.req file |
| Call type | 2nd secondary key; output from qrytt.req file |
| SS | Send\_Service; 3rd secondary key; output from qrytt.req |
| RS | Receive\_Service; 4th secondary key; output from qrytt.req |
| Mfid | message flow id; linked to message\_flow table 222 |
| P1\_CLLI | relationally linked to declaration table 226 |
| P2\_CLLI | relationally linked to declaration table 226 |
| P3\_CLLI | relationally linked to declaration table 226 |

The message\_flow table 222 is a relational database table having the following standardized fields:

| message\_flow fields | Description |
|---|---|
| Mfid | message flow id; linked to the call\_flow table 220. Each may contain several entries; |
| Sequence | a number that orders the message flow; |
| Mf\_String | Message flow string; |
| Mid | macro id; linked to the table macro; |
| Mf\_Parm1, Mf\_Parm2, | The message flow parameters are arguments |

| message\_flow fields | Description |
|---|---|
| Mf\_Parm3, Mf\_Parm4 | passed to the macro table 224. Examples of arguments are: (leg 1, orig, term), Mf\_Parm1 = 2 means pass orig, and Mf\_Parm2 = 3 means pass term. |

The macro table 224 is a relational database table having the following standardized fields:

| Macro fields | Description |
|---|---|
| Mid | Macro id created in table message\_flow. Each macro id may contain several entries; |
| Sequence | Number that orders the macros; and |
| Macro String | The actual macro used by the automation test platform. |

Still referring to FIG. 10, in the macro string field, the tilde symbol "~" means to use the first parameter column, Mf\_Parm1 of the message\_flow table 222 to determine which argument in the call\_flow string to substitute here. The dollar symbol "$" means to use the second parameter column of the message\_flow table 212 to determine which argument in the call\_flow string to convert to upper case and substitute at this point.

The declaration table 224 is a relational database table having the following standardized fields:

| declaration fields | Description |
|---|---|
| CLLI | Common-Language Location Identification |
| Sequence | Number that orders the declarations; and |
| Declare String | The testcase declares the number of trunks; e.g., orig and terminate, the declare string places this termology into the testcase. |

In the call\_flow table 220, P1\_CLLI associates to call leg 1, P2\_CLLI associates to trk0, and P3\_CLLI associates to trk1. For each abstraction, a unique set of aliases in Px\_CLLI is generated, where "x" is from one to the total number of arguments in the call flow. One declaration will exist for each unique set. In the declaration table 226, ~1 and $1 map to the alias name in Px\_CLLI.

Figure 11B:
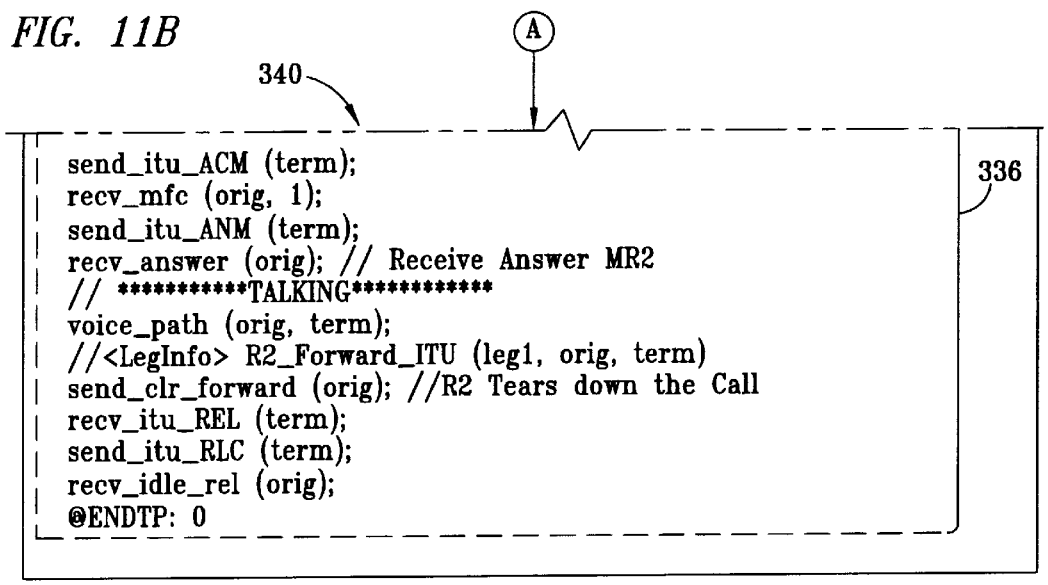
FIG. 11 is an illustration of the output of the testcase template generator.

Referring to FIG. 11, shown is an example of a TTGEN 304 output file 340. The TTGEN 304 generates a "@TEM-PLATE" block in the form of the qrytt.out file 336, which is appended with the ttgen input file (which is the TDGEN 318 output file 318). The TTGEN 304 provides an output file 330, which is passed to TVGEN 306. The TTGEN 304 also provides call states and agency interworking for a particular call type.

Referring back to FIG. 2, the TVGEN 306 creates values in the testcase template 328 provided in the ttgen.out file 330 generated by the TTGEN 304. The TVGEN 306 derives values from the rules, config files, and template variables. In the rules module 206 of the knowledge base 208, value derivations are made using standard accepted datafill customs within the system, input from the users, or a both. Most of the values generated by the TVGEN 304 refer to data that affects the target product translations.

The TVGEN 306 allows the system administrator 9 to create embedded UNIX processes such as rules. The TVGEN 306 sets the environment variables to be passed to the UNIX process upon execution of a testcase on a test execution tool 75. Through the UNIX process, a user 8 can control the testcase output.

For example, the user 8 can add standard testcase headers, additional comments, or description through the UNIX process (which is external to the TCGEN 300).

Referring to FIG. 11, the "@TEMPLATE" portion 336 of the TTGEN 304 output file 340 provides TVGEN 306 with the template variables contained within percent "%" symbols. The TVGEN 306 resolves each template variable into numerical values. The template portion 336 defines the syntax to be used by the test execution tool driver for the test execution tool 75. The template variables are created by the previous TCGEN process(es) using templates stored in the macro table 224 of the knowledge base 200 (see FIG. 10). For example, the macro table 214 has the following information:

| Mid | Seq. | Macro_String |
|---|---|---|
| *** | *** | *** |
| 27 | 1 | dtmf_dial(~1#"); |
| 27 | 2 | recv_tone(~1, c_dial_tone); |
| 27 | 3 | dtmf_dial(~1, "%$2_CDPN%"); |
| *** | *** | *** |

The "~1" in the macro string for sequence 1 means to use the first parameter column, Mf-Parm1, of the Message_Flow Table 222 to determine which argument in the Call_Flow String to substitute. The "$2" in the macro string for sequence 3 means to use the second parameter column, Mf_Parm2, of the Message_Flow Table 212 to determine which argument in the Call_Flow String to convert to upper case characters and substitute.

Referring to FIG. 2, for providing the value generations, the TVGEN 306 the following configuration files and tables must be datafilled by the administrator 9 before the TVGEN 306 can be used: (1) tvgen.cfg; (2) rules defined in tvgen.cfg; (3) Orig_Trk table; and (4) Tenn_Trk table.

The Orig_Trk table and a Term_Trk table are used for trunk selection as well as for entering trunk specific information. The tables have the following structure:

Trunk CLLI field (mandatory)

Trunk memory field (optional)

Trunk class (optional)

Call type (optional)

Trunk specific information for routing or trunk selection (optional), including: callet party number, B channels, SubNetwork Point of Attachment ("SNPA"), and/or trunk type The TVGEN 306 has a configuration file tvgen.cfg that has up to five sections, including: OrigTempValues, TermTempValues, TempValues, mandatory_titles, and optional-titles. The rule execution sequence is set by the Administrator 9 by order the rules within the [OrigTempValues] and [TermTempValues] sections of the tvgen.cfg. Both of these sections are similar in format. An example of the [OrigTempValues] section is:

shell:man:FirstFile: FirstFile.rule sql: TrkClli, TrkMem, Authcode:select orig_trk_clli, trk_mem, authcode from Orig_Trk where calltype like '$CALLTYPE$' and orig_Trk clli like '$TrkClli$' shell:opt:ANI:OrigANI.rule shell:opt:LOOP; LOOP.rule

The term "shell" is the shell designator. The term following "shell" is Position 2 of the shell: either "opt" (optional) or "man" (mandatory). Portion 3 of the shell is represented by a variable name. For example, "FirstFile," and "ANI" are in the position 3 of the shell. Position 4 of the shell is the rule file. In line one, the rule file is "FirstFile.rule." In line five, the rule file is "OrigANI.rule." An SQL query format is designated after the query instruction "sql:".

TempValues use the same rule definitions as does the Orig TempValues and the TermTempValues with two exceptions: (1) SQL query is not supported, and (2) rule variables generated in the TempValues section do not associate with "originating" or "termination."

The rules module 206, which is accessed by the TVGEN 306, contains the rules files that are discrete programs written by the administrator 9. The term "rules" as used means any UNIX process that could be encoded in Perl, or UNIX shell scripts, or object-oriented programming languages such as C, C++. Also, the rules provide programming capability to the administrator level so that adjunct or embedded process can be created in the CASDE 100. Preferably, the rule files are written in UNIX shell scripting language or a programming language such as C++. The following is an example of a rule file:

```
!/bin/ksh case$(CallType) in
"DDD")
    CDN=$(AUTHCODE)$(Npa)$(Nxx) "1234"
    ;;
"IDDD")
    CDN=$(AUTHCODE)$(Cc)$(Nxx)
    ;;
"CARD")
    CDN=$(AUTHCODE)$(Npa)$(Nxx) "1234"
    ;;
"SAC")
    CASE $ (SAC_TYPE) in
    *500*)
        CDN=$AUTHCODE500$(Npa) "0011"
    *700*)
        CDN=$AUTHCODE700$(Npa) "0011"
    *800*)
        CDN=$AUTHCODE800$(Npa) "0011"
    *900*)
        CDN=$AUTHCODE900$(Npa) "0011"
    *00Y*)
        CDN=$AUTHCODE001$(Npa) "0011"
    ;;
    *)
    ;;
;;
*)
CDN=" "
    ;;
esac
echo $(CDN)>CDN
```

The guideline for establishing rule files is that every template variable in the TTGEN output file 340 must be associated with a rule file, unless the value is supplied by some other external source. Second, each rule writes the value of the variable to a file with the same name as the variable. Third, the definition of a rule starts in the

[OrigTempValues] or [TermTempValues] section of "tvgen.cfg." An example of a rule file is:

| tvgen.cfg | VAR.rule file |
|---|---|
| [OrigTempValues] | #!/bin/ksh |
| *** | *** |
| shell:man:VAR:VAR.rule | echo $output>VAR |

Variables can be exported to rule files. Generally, variables originate from three main sources: USERIN files, SERVICE files, and the Orig_Trk and the Term_Trk tables. Variables in the [USERIN] section of the "tvgen.cfg" configuration file are defined by the system administrator 9. The values of these variables are selected by the user 8. Variables in the [SERVICE] section of the "tvgen.cfg" configuration file are also defined by the system administrator 9. The values of these variables are also selected by the user 8. The field names within the Orig_Trk and Term_Trk tables become variables within the rule files. The value of each variable (or field name) within the table is extracted by a SQL query.

USERIN variables reside in files in a directory. Preferably, the variables reside in the directory:

$CASDE_ROOT/cfg/gui/USERIN

Naming conventions are preferably used for the USERIN files, for example:

| File Type | Naming Convention | File Name Example |
|---|---|---|
| base files | <CallType>_<TrnkClass> | onnet_tlansi |
| link files | <CallType>_<TrnkClass>-<UserinVariableName> | onnet_tlansi7-customer |
| list files | _<UserinVariableName>_lists | _customer_lists |

The USERIN base file includes a variable and a default value pair. An example of variable and value pairs in a base file is:

<comment> Select lengths of calling address.
DIGITLEN=
<hr>
CUSTOMER=NIL_CUST, CUST301;
GRPTYP-AXXESS;

where:

<comment> is a one line instruction to a user;
DIGITLEN is a variable with no default value;
<hr> is a line separator between variables;
CUSTOMER is a variable with two default values; and
GRPTYP is a variable with one default value.

The USERIN list file includes at least two sections: a guidepost section for comments to the user 8; and a header line followed by a list of values and their descriptions. The following is an example of a List File:

```
[guidepost]
Select one or many customers from the following list:
[heading]
CUSTNAME    DESCRIPTION
NIL_CUST    No VPN
CUST301     Customer 301
CUST311     Customer 311
``` where:

[guidepost] is a section of multiple lines of user instruction following this tag;

[heading] indicates that the next line is a title line;

CUSTNAME and DESCRIPTION are the title line;

NIL_CUST, CUST301, AND CUST311 are the list of values under the CUSTNAME; and NO VPN, Customer 301, and Customer 311 are the value descriptions.

If there is no [guidepost] section, then the [heading] tag is not needed.

Every USERIN variable must be associated with an origination or a termination of a call leg. USERIN variables in the [mandatory_titles] section of the TVGEN configuration file "tvgen.cfg" are exported to all rule files. USERIN variables in the [optional_titles] section of the TVGEN configuration file "tvgen.cfg" are exported to rules only if the variables appear in the testcase template input file "ttgen.out." If a USERIN variable in the [mandatory_titles] or [optional_titles] sections of the configuration file "tvgen.cfg" has multiple values assigned, the end result will be a permutation of testcases where each testcase uses one of the values.

The following is an example of the [mandatory_titles] and [optional_titles] sections of the USERIN Variables:

```
[mandatory_titles]
oalias          AUTHCODE=
oalias          II=
oalias          ANI=
talias          LRD=
***
[optional_titles]
oalias          CARD=
***
``` where:

"oalias" is a keyword defining the variable associated with an origination;

"talias" is a keyword defining the variable associated with a termination; and

AUTHCODE, II, ANI, LRD, and CARD are variables.

The SERVICE Variables preferably reside in files in the following directory:

$CASDE_ROOT/cfg/gui/SERVICE/ORIG $CASDE_ROOT/cfg/gui/SERVICE/TERM

The following name conventions are used for SERVICE files:

| File Type | SERVICE File Naming Convention | File Name Example |
|---|---|---|
| base files | <CallType>_<TrnkClass> | onnet_tlansi7 |
| link files | <CallType>_<TrnkClass>-<UserinVariableName> | onnet_tlansi7-cos |
| list files | _<UserinVariableName>_lists | _cos_lists |

A Service Base File includes a variable and default value pairs. An example of a variable and value pairs in the Base File for the SERVICE files is:

COS=0;
ACCTLEN=0;

where:

COS is a variable with one default value; and

ACCTLEN is a variable with one default value.

A Service Variable List File includes up to two sections: an optional [guidepost] section for comments to the user 8, and a mandatory header line followed by a list of values and their descriptions. An example of a Service List File is

| INCLASS | TERM CLASS0–TERM CLASS29 |
|---------|--------------------------|
| 0 | yyyyyyyyy ynnnynnnn nnnnnn nnnnnn |
| 1 | ynyny nnnnnn yyyynnnn nnnnnnnnnn | where: INCLASS and TERM CLASS0–TERM CLASS29 are the title lines; and 0 and 1 are the list of values under the INCLASS.

A SQL query within the TVGEN 306 can be conducted within certain parameters. One reserved keyword, TrkClli, exists in the [OrigTempValues] and [TermTempValues] sections of the TVGEN configuration file "tvgen.cfg." The system administrator 9 can use the following keywords from the GUI output file 502 (see TABLE 1) files: CALLTYPE, OALIAS, OTRKCLASS, OPROTOCOL, TALIAS, TTRKCLASS, and TPROTOCOL For the SQL query, the keywords are referenced using a "$" symbol both before and after the keyword name. The queries are conducted on the Orig_Trk and Term_Trk tables.

The output file of the TVGEN "tvgen.out" contains lines of template variable and value pairs. The following is an example of the value generated output from TVGEN:

@TPID:

* * *

@TEMPLATE:

* * *

@VARIABLES:

ORIG=PTSFGDTRUNK

TERM=PTSDAL TRUNK

TERM_CDPN=5551212

Another process, TSGEN 305, is available to substitute values in the testcase template generated by the TTGEN 304 and TVGEN 306. The purpose of the substitutions is to merge the information from TCGEN processes to generate a final testcase so that it is a rough, final testcase. That is, the TSGEN 305 is to target the template for a particular execution environment or platform, such as STEP. It makes the system execution environment portable by allowing execution.

The TSGEN 305 inserts or deletes macros left undetermined by the TTGEN 304. The TSGEN 305 includes a users testcase section in the final file format for added flexibility to testcase design portability.

The TSGEN 305 also constructs datafill change information. The TSGEN 305 removes intermediate lines in the TSGEN input file "ttgen.out" 340 to make the resulting testcase 600 product resemble a testcase format presently used, easing the transition from the manual testcase generation methods to the automated testcase generation method.

The input file "ttgen.out" to the TSGEN 305 has the following sections: variables input format, a lines input format, the datafill input format, the user included files, the $RETAIN_NEXT_LINES$( ), and the $RANDOM_LINES_OVERLAP$( ).

The following is an example of the variable section of the input file "ttgen.out" 340 to the TSGEN 305:

@TEMPLATE:

//COMMENT:%RECURSIVE%;

* * *

@VARIABLES:

term_cdpn=18005551212

RECURSIVE=%KEYWORD% call

KEYWORD=DAL origination

The following is a description of this example:

| | Description |
|---|---|
| @TEMPLATE: | |
| %RECURSIVE% | template variable |
| %TERM_CDPN% | template variable |
| @VARIABLES: | |
| 18005551212 | value of the variable TERM_CDPN |
| %KEYWORD% call | value of the variable RECURSIVE |
| DAL origination | value of the variable KEYWORD |

The following is an example of the datafill portion of the input file "ttgen.out" to the TSGEN 305:

```
                    ***
               @DMOFILES:
               ./dmo_AAAa14381
                    ***
```

The following is the contents of the file ./dmo_AAAA14381, which is generated by the TDGEN 302:

table isupattr key 101 field sce value 123

The TSGEN 305 permits a user 8 to add lines and information to the TSGEN 305 output file. For example, a user can include the following file format:

@ACTID: AD2468

@AUTHOR: JOHN DOE

@SUBSYSTEM:MCI_VNET

@TITLE: ABC TEST

@TASKID: XYZ

The include lines are found in a file owned by the user 8. The file location of the user include file is stored in the environment variable TSGEN_INCL.

The TSGEN 305 also determines which lines to retain for its output file. The determination is made through the function $RETAIN_NEXT_LINES$( ). An example of the $RETAIN_NEXT_LINES$( ) function call is:

* * *

$RETAIN_NEXT_LINES$(%ORIG_ACCTLEN% !=0)

recv_tone(orig);

send_dtmf(orig, "%ORIG_ACCTCODE%");

$RETAIN_ENDS$

The only argument in the $RETAIN_NEXT_LINES$( ) is a boolean condition. The example here is %ORIG_

ACCTLEN% !=0. The marker $RETAIN_ENDS$ designates the end of the retained lines.

The TSGEN 305 also generates an output that repeats a selected number of lines at random to perform overlap testing in selected protocols. This function is provided under a call to the $RANDOM_LINES_OVERLAP$( ) function. An example of the call is:

\* \* \*

$RANDOM_LINES_OVERLAP$(3,0,%TERM_CDPN%)

// break calling party into several parts orig.called_party_number="%TERM_CDPN%";

send info(orig);

Three arguments are passed in the $RANDOM_LINES_OVERLAPS$( ). The first argument is the number of lines that need to be repeated. In this example, the number of lines to be repeated are "3". The second argument is a designator of whether to repeat at random, where a "0" indicates to repeat at random, and a value of "1" to "N" means to repeat N number of times. The third argument is the variables values that are split into separate parts. In this example, the variable value that is split into separate parts is %TERM_CDPN%.

The TSGEN 305 provides a [TAG MAPPING] section. Tag mapping provides find and replace functionalities. There are three tags predefined by the TSGEN 305 in the "tsgen.cfg" configuration file:

[TAG_MAPPING]

@TCID:=@TESTCASEID:

@PATH:=@SCRIPT:

@DATAFILL:=@DMOPRO:

| Syntax | Description |
|---|---|
| @TCID: | 1st predefined tag |
| @PATH | 2nd predefined tag |
| @DATAFILL: | 3rd predefined tag |
| @TESTCASEID: | changed tag from @TCID: |
| @SCRIPT: | changed tag from @PATH: |
| @DMOPRO: | changed tag from @DATAFILL: |

The TSGEN 305 provides an [INCLUDE_SECTION] section in which the administrator 9 can have further information added to the TSGEN output file "tsgen.out." An example of an [INCLUDE_SECTION] is:

[INCLUDE_SECTION]

@PLATFORM: STEP

169 KEYWORD: %KEYWORDS%

@DESCRIPTION: %DESCRIPTION% where:

| Include Lines | Description |
|---|---|
| @PLATFORM:STEP | lines in this section are included in the TSGEN output file "tsgen.out." |
| @KEYWORD: %KEYWORDS% | may contain variables, such as %KEYWORDS%. |

The TSGEN 305 performs substitutions for variables, lines, datafill, and macros. The TSGEN 305 also permits "user included" lines.

An example of variable substitution is provided by the following:

@CODE:

//COMMENT:DAL origination call off_hook(orig);

dtmf_dial(orig,"18005551212");

Where "DAL origination call" is the replacement value for the input variable %RECURSIVE%, where "18005551212" is the replacement value for the input variable %TERM_CDPN%. The output of the substitution in the "tsgen.out" file is as follows:

|  | \*\*\* | |
|---|---|---|
|  | @Line one of multi-lines | |
|  | @Line two of multi-lines | |
|  | @Line three of multi-lines | |
|  | @Line four of multi-lines | |
|  | dtmf_dial(orig,"2145551212"); | |
|  | \*\*\* | |
| where: | //Line X or multi-lines | lines 1–4 are replacement lines for input variable %MULTILINES% |
|  | 2145551212 | replacement value for input variable %TERM_CDPN% |

The [DATAFILL] substitution section of the TSGEN 305 output file is:

\* \* \*

@DATAFILL:

DMOPRO:

table isupattr key 101 field scc value 123

@CODE:

\* \* \*

An example of the "user include" file portion of the output of TSGEN:

@TCID: TC000001

@ACTID: AD2466

@AUTHOR: JOHN DOE

@SUBSYSTEM:MCI_VNET

@TITLE: ABC TEST

@TASKID: XYZ

@CODE:

The TMGEN 308, shown in FIG. 2, interfaces with the test execution tool 75 protocol object files to encode and decode down to parameter and field level of industry messaging protocols (out-of-band protocols, such as SS7, and in-band protocols).

Symbolic messages are converted into hexadecimal, or machine readable, values. That is, because the TMGEN input file is not a test execution tool 75 executable testcase, the TMGEN 308 replaces the symbolic messages with hex messages in the TMGEN output file. The TMGEN output file is the testcase output file 500 executable on the test execution tool 75, which in the present example is a STEP. The STEP syntax only supports hexadecimal strings for messaging. The following is an example of the symbolic values:

\* \* \* set_val(oalias, prot.msg.parm.fld, "symbolic value");

send_IAM(oalias);

```
recv_IAM(talias);
chk_val(talias.prot.msg.parm.fld, "symbolic value");
* * *
```
The set_val statements must be entered immediately before the corresponding send macro. The chk_val statements must be entered immediately after the corresponding receiving macro. The keywords used are described as:

| Keywords | Description |
| --- | --- |
| oalias, talias | alias value; trk 1, trk 2 |
| prot | alias protocol |
| msg | message type |
| parm | parameter name |
| fld | field name |
| symbolic value | value as chosen by the user |

The TMGEN 308 has a the following sections in its configuration files:

[STEP_CFG_FILES]

[MESSAGES]

The TMGEN 308 uses STEP Structural Protocol Definition ("SPD") files to convert messaging from symbolic values to hexadecimal values. The STEP_CFG_FILES section associates protocols with location of the STEP SPD file as described in the following tmgen.cfg example:

```
* * *
    [STEP_CFG_FILES]
* * *
    ansi7 /brn/users/conan2/mcistep/configs/protocols/
        ansi7.cfg
* * *
```

The first column of this section has a protocol name, in this example, "ansi7." The second column of this section has the STEP SPD file location of the protocol. The following "tmgen.cfg" file is a MESSAGES section that invokes TMGEN to build a message in hexadecimal format:

```
* * *
    [MESSAGES]
    send_ansi7_IAM
    send_ansi7_ACM
    send_ansi7_ANM
    send_ansi7_RLC
    send_ansi7_REL
* * *
```

While processing of the GUI output file 502 through the TCGEN 300, the testcase 600 is generated as shown in FIG. 12. The generated testcase 600 is a black box functional test. The focus of the test is not on structural or manufacturing faults, but with behavioral faults. That is, situations where the software application fails to function properly. The generated testcase 600, executed on the test execution tool 75, to forces the execution test execution tool. The testcase 600 has agency portions 602, call flow portions 604, values portions 606, and protocol portions 606, which convey call leg data to the execution tool 75 for testing an AUT. The advantage illustrated by the present invention is that the user 8 had to provide only the functional level connections for a call leg. No implementation knowledge was required of the user of the underlying characteristics of the target system.

* * *

Sending ETSIPRI SETUP Message on Originator:
trk0.channel_identification="E1 81 83 85";
trk0.bearer_capability="80 90 A2";
trk0.called_party_number="A1 38 33 32 31 32 33 34";
trk0.callingparty_number="A 1 31 31"
send setup(trk0);
//Receiving ETSIPRI SETUP Message on Terminator:
recv_setup(trk1);
check_val(trk 1.called_party_number, "A1 38 33 32 31 32 33 34");
* * *

Although the present invention and its advantages have been described in detail, it should be understood that various changes, substitutions and alterations can be made therein without departing from the spirit and scope of the invention as defined by the appended claims.

What is claimed is:

1. An apparatus for generating a model reference testcase for a target system, the apparatus comprising:
   a computer system having an electronic memory storage device,
   a knowledge base stored on said electronic memory storage device, said knowledge base having a set of functional description data relating to the target system;
   a user interface program executable by said computer system, said user interface program for inputting a high-level testcase request and for converting said testcase request into an output file; and
   a testcase generation program executable by said computer system, said testcase generation program accepting as an input argument said output file of said user interface program, said testcase generation program having access to said knowledge base for processing said output file into an executable testcase, said testcase generation program having a plurality of generation modules arranged in an open chain configuration.

2. The apparatus for generating a model reference testcase of claim 1 wherein said testcase generation program comprises:
   a testcase datafill generator for datafilling fields in said output file;
   a testcase template generator for providing a template in said output file for a call flow;
   a testcase value generator for translating at least one alphanumeric variable representation of said output file into a corresponding numeric value; and
   a testcase messaging generator for inserting at least one telephony message protocol in said output file, each of said generators having a subprogram with access to said set of functional description data of said knowledge base and having an input argument and an output argument that are passed in a chain fashion among said plurality of generation modules.

3. The apparatus for generating a model reference testcase of claim 2 wherein said plurality of generation modules further comprise:
   a testcase substitution module for providing portability of said executable testcase to a plurality of execution test tool platforms, said testcase substitution module having a subprogram with access to said set of functional description data of said knowledge base and having an input argument and an output argument.

4. A method, executable on a computer system, for generating a model reference testcase for a target system, the method comprises the steps of:
   generating a testcase request file using a graphic user interface that accepts a high-level request, the testcase request file being based on a high-level target system function;

datafilling the testcase request file;

generating a template in the testcase request file for a call flow;

translating at least one alphanumeric variable representation to a corresponding numeric value in the testcase request file from a rules module; and inserting at least one telephony message protocol in the testcase request file.

5. An apparatus for generating a model reference testcase for a telephony target system, the apparatus comprising:

a computer system having an electronic memory storage device, a knowledge base stored on said electronic memory storage device, said knowledge base including a system configuration module, a functional module, a rules module, and a protocol standards module, said modules establishing a set of functional description data relating to the target system;

a user interface program executable by said computer system, said user interface program receiving a high-level testcase request and formatting said testcase request in an output file; and a testcase generation program executable by said computer system, said testcase generation program accepting as an input argument said output file of said user interface program, said testcase generation program having access to said knowledge base for converting said output file into an executable testcase, said testcase generation program having a plurality of generation modules arranged in an open chain configuration.

6. The apparatus for generating a model reference testcase of claim 5 wherein said plurality of generation modules include:

a testcase datafill generator for datafilling fields in said output file;

a testcase template generator for providing a template in said output file for a call flow;

a testcase value generator for translating at least one alphanumeric variable representation of said output file into a corresponding numeric value; and a testcase messaging generator for inserting at least one telephony message protocol in said output file, each of said generators having a subprogram with access to said set of functional description data of said knowledge base and having an input argument and an output argument that are passed in a chain fashion among said plurality of generation modules.

7. The apparatus for generating a model reference testcase of claim 6 wherein said plurality of generation modules further include:

a testcase substitution generator for providing portability of said executable testcase to a plurality of execution test tool platforms, said testcase substitution module having a subprogram with access to said set of functional description data of said knowledge base and having an input argument and an output argument.

8. An apparatus for generating a test call testcase for a telephony target system, the apparatus comprising:

means for generating a testcase request file using a graphic user interface that accepts a high-level request, the testcase request file being based on a high-level target system function;

means for datafilling the testcase request file;

means for generating a template in the testcase request file for a call flow;

means for translating at least one alphanumeric variable representation to a corresponding numeric value in the testcase request file from a rules module; and means for inserting at least one telephony message protocol in said testcase request file.

* * * * *

UNITED STATES PATENT AND TRADEMARK OFFICE
CERTIFICATE OF CORRECTION

PATENT NO.    : 6,148,277
DATED         : November 14, 2000
INVENTOR(S)   : Asava et al.

It is certified that error appears in the above-identified patent and that said Letters Patent is hereby corrected as shown below:

Column 11,
Line 3, delete "// -_ any_ _ any__any_", insert -- // - _any_ _any_ _any_ --
Line 12, delete "__" and insert -- a dash (-) --

Column 13,
Line 42, delete "Tenn_Trk" and insert -- Term_Trk --
Line 59, delete "optional-titles" and insert -- optional_titles --

Column 14,
Line 1, delete "orig_Trk" and insert -- orig_trk --

Column 15,
Line 32, delete "onnet_tlansi" insert -- onnet_t1ansi --
Line 33, delete "onnet_tlansi7-customer" insert -- onnet_t1ansi7-customer --

Column 16,
Line 57, delete "onnet_tlansi7" insert -- onnet_t1ansi7 --
Line 58, delete "onnet_tlansi7-cos" insert -- onnet_t1ansi7-cos --

Column 18,
Line 41, delete "sce" and insert -- scc --

Column 19,
Line 14, delete "send info(orig);" and insert -- send_info(orig); --
Line 51, delete "169"

Column 20,
Line 48, on next line after "@CODE:", insert -- * * * --

UNITED STATES PATENT AND TRADEMARK OFFICE
CERTIFICATE OF CORRECTION

PATENT NO. : 6,148,277
DATED : November 14, 2000
INVENTOR(S) : Asava et al.

It is certified that error appears in the above-identified patent and that said Letters Patent is hereby corrected as shown below:

Column 22,
Line 3, delete "trk0.callingparty_number="A 1 31 31" " insert
-- trk0.calling_party_number="A1 31 31" --
Line 4, delete "send setup(trk0);" and send_setup(trk0); --

Signed and Sealed this

Twenty-fifth Day of December, 2001

Attest:

JAMES E. ROGAN
*Director of the United States Patent and Trademark Office*

*Attesting Officer*